US010927986B2

(12) United States Patent
Giovannini

(10) Patent No.: US 10,927,986 B2
(45) Date of Patent: Feb. 23, 2021

(54) UNIVERSAL DEVICE FOR THE REPLACEMENT OF WORN OR LACERATED PARTS OF CONNECTING CONDUITS BETWEEN COMPONENTS OF CLIMATE CONTROL, COOLING OR HYDRAULIC SYSTEMS

(71) Applicant: Flexin Group S.R.L., Sasso Marconi (IT)

(72) Inventor: Mirco Giovannini, Zola Predosa (IT)

(73) Assignee: FLEXIN GROUP S.R.L., Sasso Marconi (IT)

( * ) Notice: Subject to any disclaimer, the term of this patent is extended or adjusted under 35 U.S.C. 154(b) by 400 days.

(21) Appl. No.: 15/830,346

(22) Filed: Dec. 4, 2017

(65) Prior Publication Data
US 2018/0180213 A1   Jun. 28, 2018

(30) Foreign Application Priority Data

Dec. 22, 2016   (IT) .......................... 202016000130323

(51) Int. Cl.
| F16L 19/06 | (2006.01) |
| F16L 27/08 | (2006.01) |
| F16L 55/16 | (2006.01) |
| F16L 33/035 | (2006.01) |
| F16L 13/14 | (2006.01) |
| F16L 33/18 | (2006.01) |
| F16L 33/207 | (2006.01) |

(52) U.S. Cl.
CPC ........... *F16L 19/061* (2013.01); *F16L 13/141* (2013.01); *F16L 27/0861* (2013.01); *F16L 33/035* (2013.01); *F16L 33/18* (2013.01); *F16L 33/2073* (2013.01); *F16L 55/1608* (2013.01)

(58) Field of Classification Search
CPC ....... F16L 55/18; F16L 19/061; F16L 19/103; F16L 27/0861; F16L 33/035; F16L 33/2073
USPC ......................................... 285/238, 348, 354
See application file for complete search history.

(56) References Cited

U.S. PATENT DOCUMENTS

| 4,138,145 A * | 2/1979 | Lawrence ............. F16L 19/061 |
| 4,822,082 A * | 4/1989 | Phillipps ............... F16L 19/061 |
| | | 285/348 |
| 2006/0138774 A1* | 6/2006 | Williams ............. F16L 19/061 |

(Continued)

FOREIGN PATENT DOCUMENTS

EP   2691680 A1   2/2014

*Primary Examiner* — Zachary T Dragicevich
(74) *Attorney, Agent, or Firm* — Shuttleworth & Ingersoll, PLC; Timothy J. Klima

(57) ABSTRACT

A universal device for replacing worn or lacerated parts of connecting conduits between components of climate control or cooling or hydraulic systems for the connection between components of new climate control or cooling or hydraulic systems, comprising a metal sleeve provided at an end of a coupling for pipes joined to it in a sealed fashion, designed to be fitted and clamped on a stretch of rigid pipe joined to a connector for connection of the connecting conduit to a component, and at the other end of a fitting for connection with a flexible hose designed to replace the worn or lacerated connecting conduit. The sleeve can be rectilinear or curved with angle of approximately 45° or approximately 90°. The previous device is prepared in a kit according to different sizes.

5 Claims, 7 Drawing Sheets

(56) References Cited

U.S. PATENT DOCUMENTS

2010/0028101 A1* 2/2010 Bottura ................ F16L 19/061
2010/0117352 A1* 5/2010 Felder ................... F16L 19/061
2013/0168959 A1* 7/2013 Turk ..................... F16L 19/061

* cited by examiner

FIG. 4
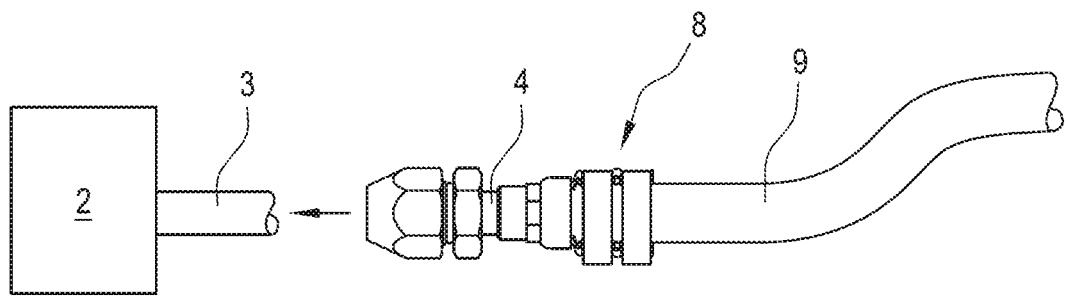
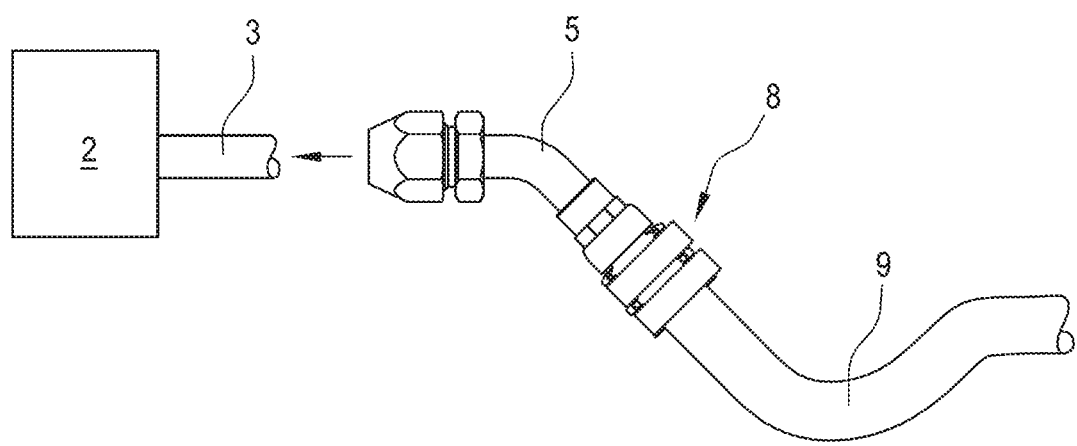
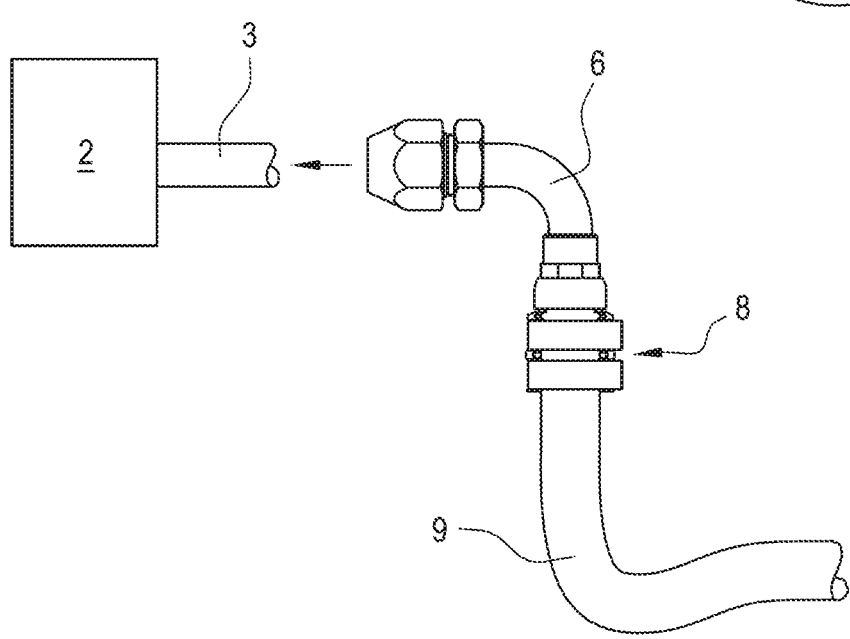

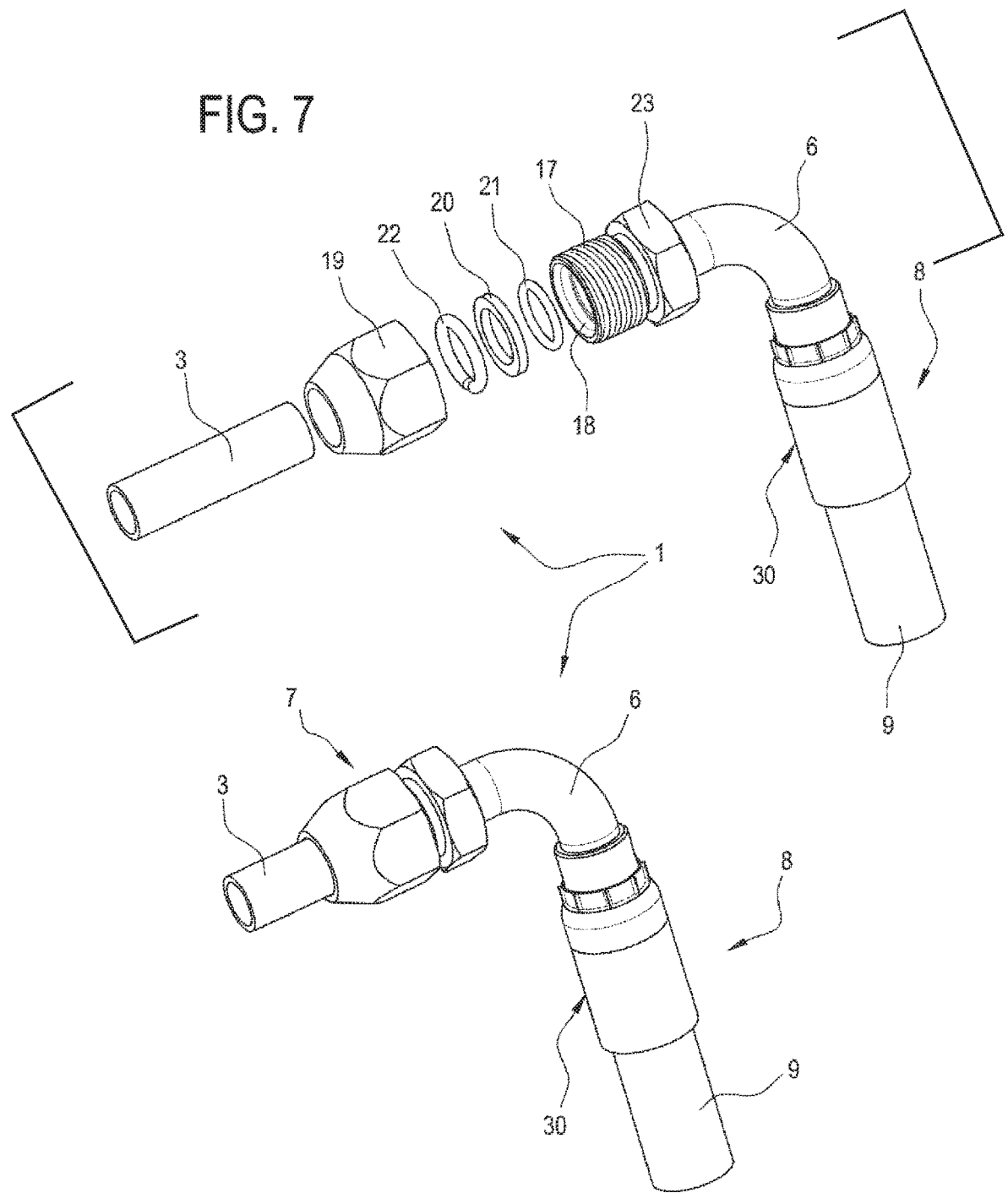

UNIVERSAL DEVICE FOR THE REPLACEMENT OF WORN OR LACERATED PARTS OF CONNECTING CONDUITS BETWEEN COMPONENTS OF CLIMATE CONTROL, COOLING OR HYDRAULIC SYSTEMS

This application claims priority to Italian Patent Application 202016000130323 filed Dec. 22, 2016, the entirety of which is incorporated by reference herein.

BACKGROUND

This invention relates to the sector of producing apparatuses for climate control or cooling or hydraulic systems, in particular, but without limiting the scope of the invention installed on vehicles, and in particular relates to a device which allows the easy and fast replacement of a coupling in a climate control or cooling or hydraulic system, following its damage or which allows the connection between climate control or cooling or hydraulic components in new systems.

As is known, in particular in the sector of vehicles to which reference will be made below but without limiting the scope of the invention, the seal of the connecting conduits between the various components in these types of systems adopts a fundamental role for the correct and effective operation of the apparatus since the fluid is normally under pressure.

The connecting conduits are usually formed by a rubber hose, at the ends of which it is joined to a metal coupling joined to it to allow the connection with the various components (users) of the system (compressor, capacitor, etc.).

Sometimes, due to the vibrations to which the system is subjected, which means they repeatedly rub against the edge of the metal coupling, or on account of defects or poor quality of the material from which they are made, the rubber hose progressively wears to the point of producing lacerations on itself, giving rise to unwanted leaks, or, over time, even complete breakage, thus adversely affecting the seal of the circuit.

In this case, it is obviously necessary to reconstruct the seal of the circuit with the replacement of the hose and the associated coupling.

Shapes and sizes of the couplings are often modified, for commercial reasons, by the manufacturers, so that there are many different types of couplings adopted on vehicles of various makes and also of different types and series.

This forces the repair workshops to dedicate large storage areas to keep available the many different types of hoses assembled with the respective couplings, with the consequent costs, or to order, each time it is necessary, the hose assembled with the respective coupling, resulting in lengthy repair times for the customers.

This also means that, to date, a universal type spare part is not available on the market.

SUMMARY

The aim of this invention is to provide a device, also simply called a "kit", for the repair technicians in the workshops which overcomes the need each time of both requesting the assembled hose to be replaced and the provision of storage areas and large quantities of assembled hoses of different kinds and sizes.

Another aim of the invention is to provide the repair technician with a kit which allows the repair on the worn, lacerated or broken pipe to be carried out quickly and extremely easily, adapting assembly elements in order to impart to them a greater efficiency and operational utility.

A further aim of the invention is to provide a device for replacing worn or lacerated parts of connecting conduits between components of climate control or cooling or hydraulic systems or for the connection between climate control or cooling components in new systems which prevents the presence of welding and which is particularly simple and effective at high pressures.

The above-mentioned aims are achieved by means of a universal device for replacing worn or lacerated parts of connecting conduits between components of climate control or cooling or hydraulic systems, in particular, but without restricting the scope of the invention, of vehicles, the connecting conduits being equipped at each of the ends with a connector for connection to a relative component of the system, from the connector originating a stretch of rigid pipe provided for connection of the connector to an end of the respective connecting conduit, the device comprising a metal sleeve equipped at one end with a coupling for pipes joined to it in a sealed fashion, designed to be fitted and clamped on the section of rigid pipe of the connector suitably cut, and at the other end with a fitting for connection with a flexible hose designed to replace the worn or lacerated conduit. The features of the invention not emerging from the above description will be described in detail below, to be considered with reference to the accompanying drawings, in which:

BRIEF DESCRIPTION OF DRAWINGS

FIG. 4 shows the three above-mentioned variants of the device in assembly configurations by way of example;

FIG. 7 illustrates the device according to the invention in an exploded and assembled configuration according to a further embodiment.

DETAILED DESCRIPTION

With reference to the above-mentioned drawings, the numeral 1 denotes the universal device for the replacement of worn or lacerated parts of connecting conduits (not illustrated) between components of climate control or cooling or hydraulic systems, in particular, but not necessarily, for vehicles.

It should be noted that the device 1 may be applied in a plurality of sectors, by way of example: automotive, off-highway, industrial, civil, commercial, military vehicles etc.

Moreover, the device 1 may be used for the connection of different elements or parts of new climate control or cooling or hydraulic systems.

Reference will hereinafter be made to a motor vehicle or, more generally speaking, to a vehicle, without this limiting the scope of the invention.

According to known methods, the connecting conduits between the components of climate control systems of motor vehicles are provided, at each of the ends, with a connector 2, which is designed to allow the connection of the conduit to a respective component of the system.

From the connector 2 originates a stretch of rigid pipe 3 provided for connection of the connector 2 at an end of the respective connecting conduit. The connection between the stretch of rigid pipe 3, usually made of metal material (preferably aluminium, copper or iron), and the conduit, usually a flexible rubber hose, is made with the deformation of the end part of the rigid pipe, which is tightened, by suitable crimping presses, on the end of the rubber hose introduced in it.

The rubber hose is of the type suitable for high pressures and the closing action of the rigid pipe 3 on the rubber hose must also be such as to form a seal of the connection even with high pressures.

As stated in the introduction, the vibrations to which the connecting conduit is subjected due to the rhythmic movements of the engine and/or the vehicle can lead the edge of the rigid pipe 3 tightened on the rubber hose cutting the latter over time, causing leakages and forcing the replacement of the connecting conduit.

Figure 1:
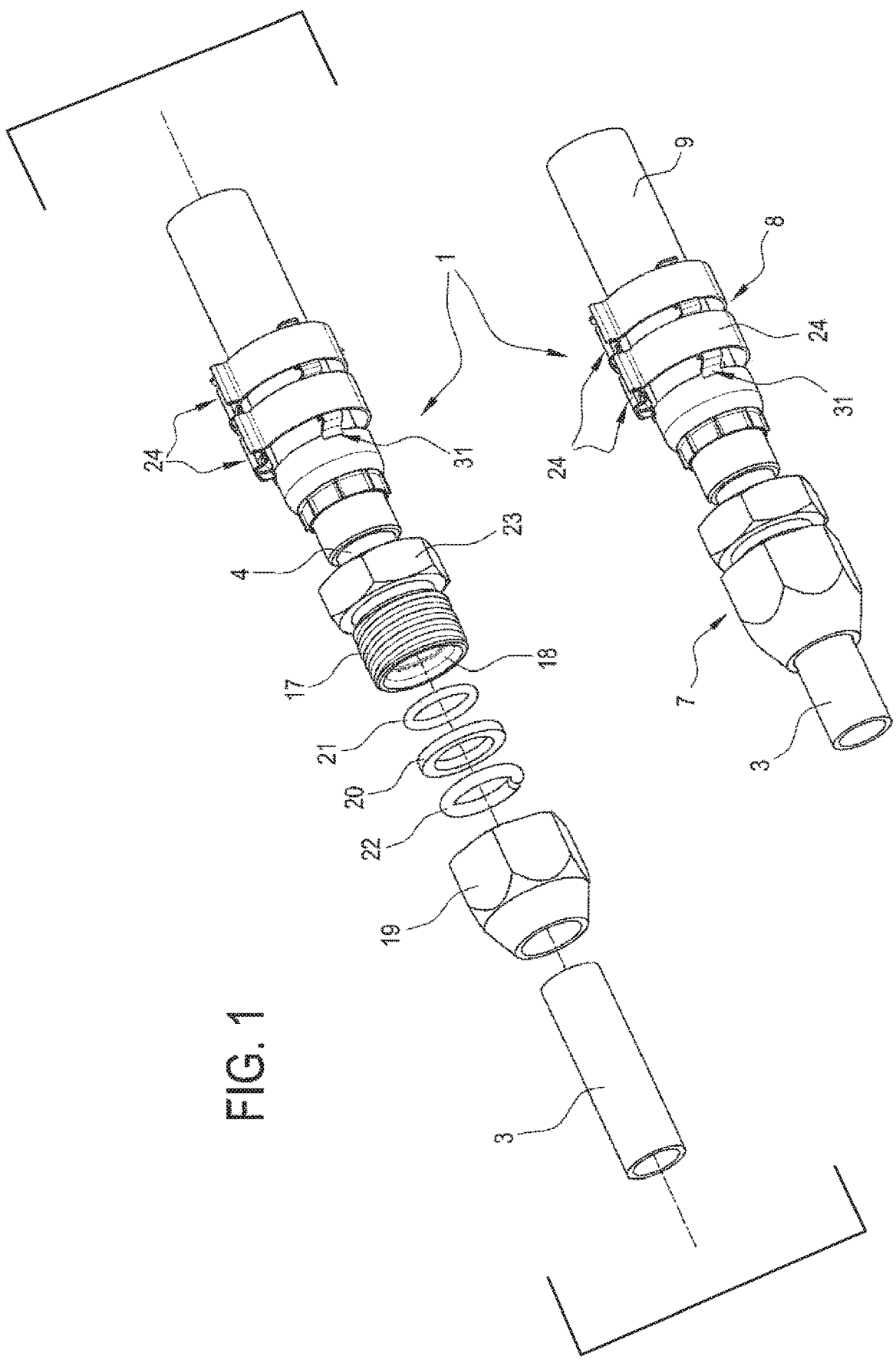
FIG. 1 illustrates the device according to the invention according to a first embodiment in an exploded and assembled configuration.

The device 1 proposed consists of a metal sleeve 4, as illustrated in FIG. 1, equipped at one end with a coupling 7 for pipes, for example pipes made of copper or aluminium used in hydraulic systems.

More in detail, as shown in FIG. 1, the coupling 7 comprises a threaded head 17 in which is made an inner annular seat 18, the function of which is described in more detail below.

On the threaded head 17 is screwed a lock nut 19, having a section with a tapered extension. The lock nut must be fitted on the pipe to which the coupling must be connected, in this case the section of rigid pipe 3 of the connector 2.

The coupling also comprises a clamping ring 22 which is inserted inside the lock nut 19 with the stretch of the rigid pipe 3 introduced through it.

A washer 20 is provided alongside the clamping ring 22 (more specifically, from the part of the clamping ring 22 facing, in use, towards the fitting 8) (as illustrated in FIG. 1).

Lastly, a seal ring 21 is applied on the section of rigid pipe 3 between the washer 20 and the annular seat 18 of the threaded head 17, inserting in the seat itself, to make the seal when the lock nut 19 is tightened.

The threaded head 17 of the coupling 7 is joined in a sealed fashion with the sleeve 4 and in the joining zone has a prismatic cross section 23, usually hexagonal, for applying a tool, for example a spanner, for tightening the nut 19.

The other end of the sleeve 4 has a fitting 8 for connecting with a flexible hose 9 designed to replace the worn or lacerated conduit.

The fitting 8 may have a plurality of longitudinal tabs 31 and circumferential clips 24 (as illustrated in FIGS. 1 to 4).

Figure 5:
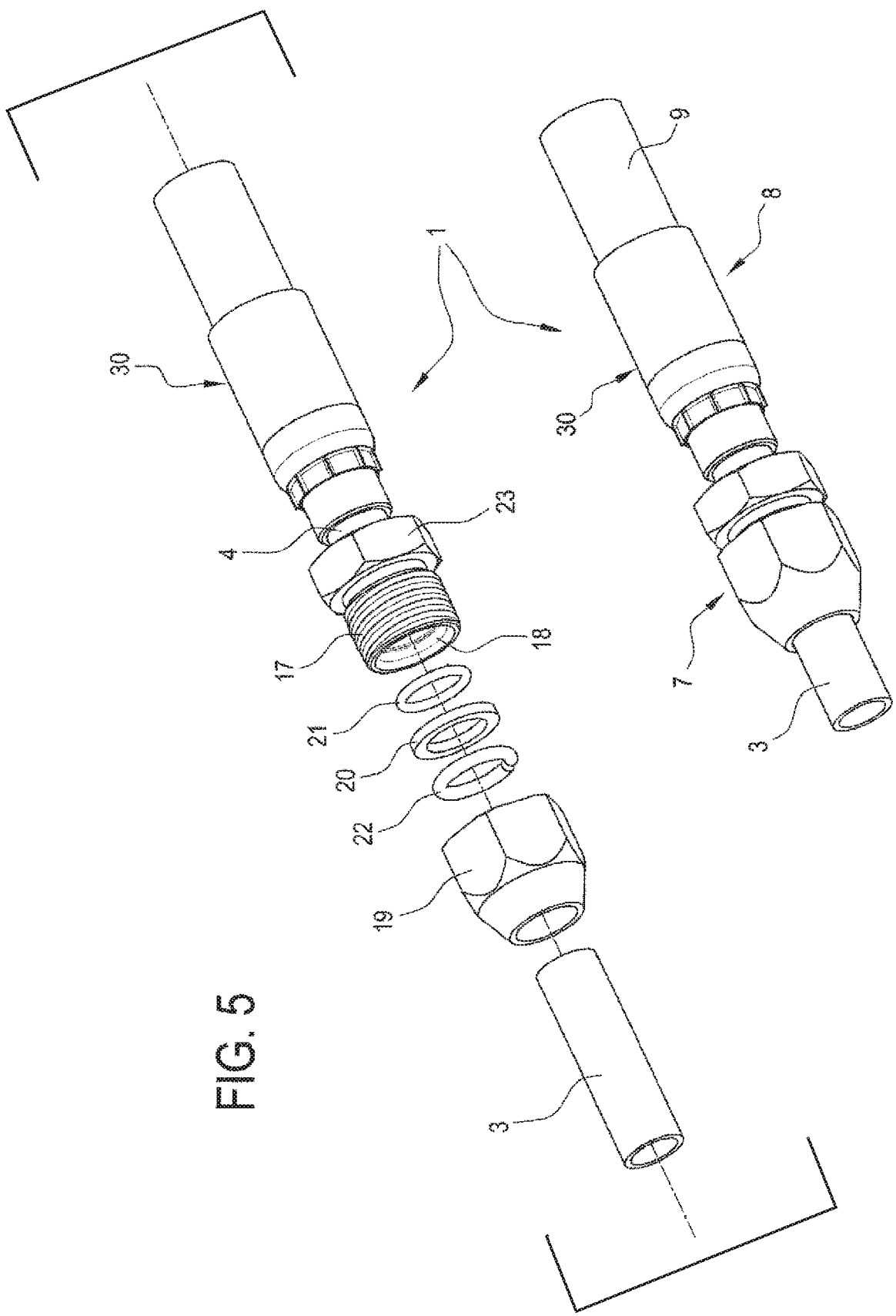
FIG. 5 illustrates the device according to the invention in an exploded and assembled configuration according to a further embodiment.
Figure 6:
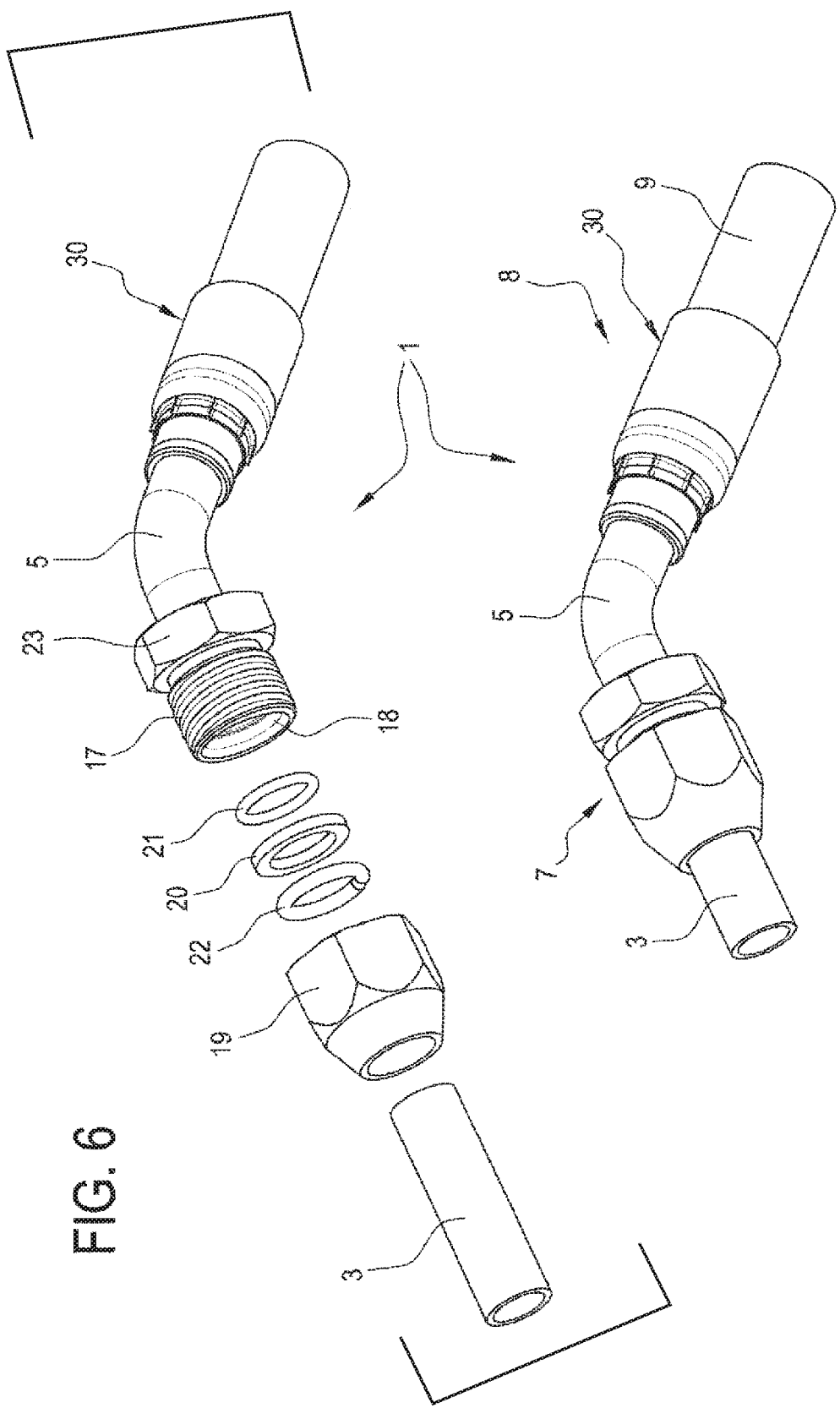
FIG. 6 illustrates the device according to the invention in an exploded and assembled configuration according to a further embodiment.

Alternatively, as illustrated in FIGS. 5 to 7, the fitting 8 may comprise a bushing 30, which is crimped on the flexible hose 9.

The circumferential clips 24 are clamped, through a gripper (not illustrated), so as to lock the flexible hose 9 to the above-mentioned end of the sleeve 4 having a fitting 8.

As illustrated in FIG. 1, the stretch of pipe 3 originating from the connector 2 has a rectilinear extension and has been cut to a length sufficient to allow the application of the coupling 7.

The cutting of the stretch of pipe 3 is necessary to eliminate the deformed part of it used for fixing the connecting conduit.

The cutting may be performed with any tool equipped with a suitable blade for cutting metal parts (saw, grinder, pipe cutter etc.).

Figure 2:
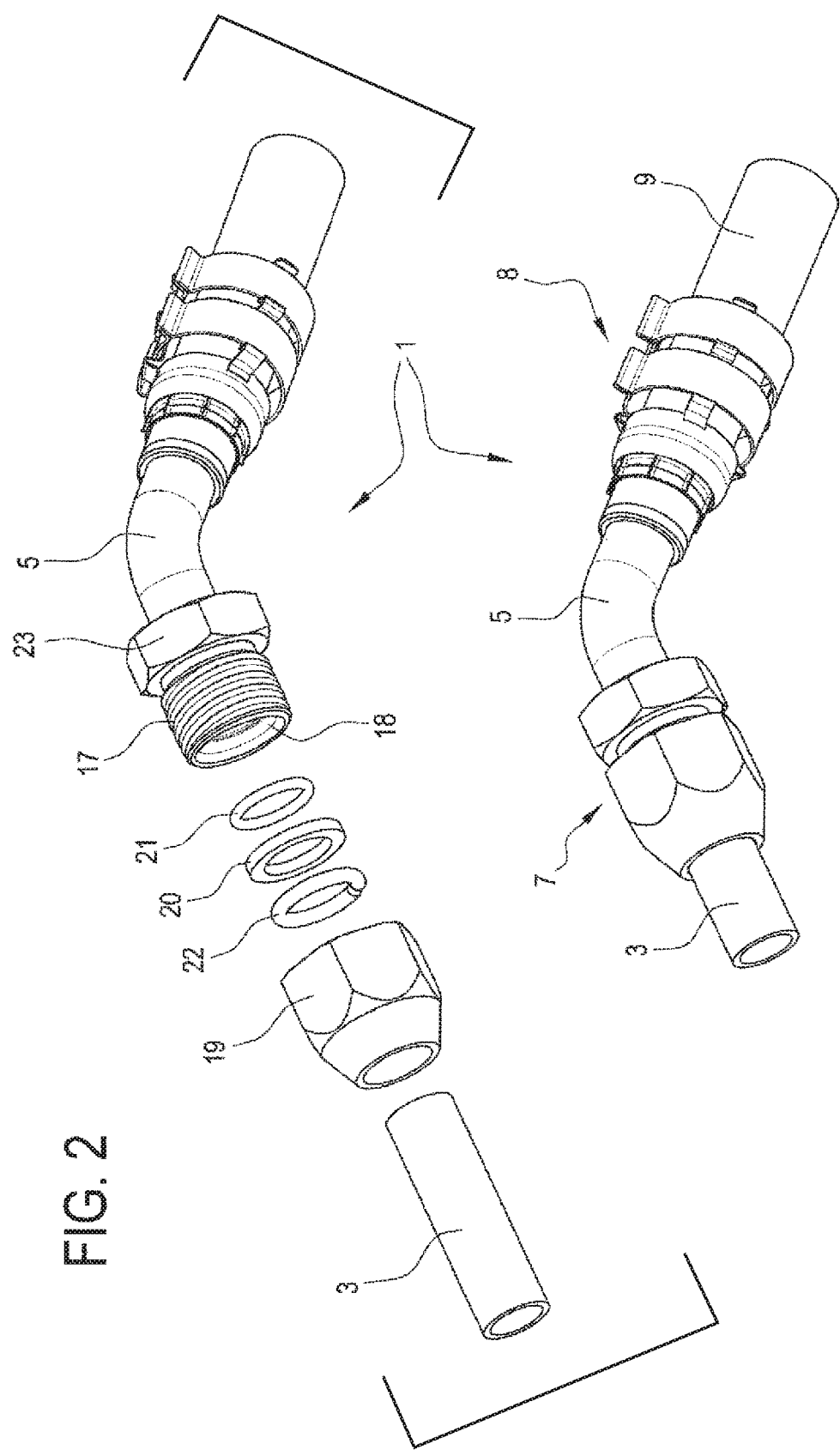
FIG. 2 illustrates the device according to the invention in an exploded and assembled configuration according to a first variant embodiment.

FIG. 1 also shows that the sleeve 4 has a rectilinear extension. However, in some cases, the straight shape of the sleeve might not be ideal, and therefore, as illustrated in FIG. 2, the sleeve 5 may adopt, in a first variant, a curved extension, for example according to an angle of approximately 45° (FIG. 2).

Figure 3:
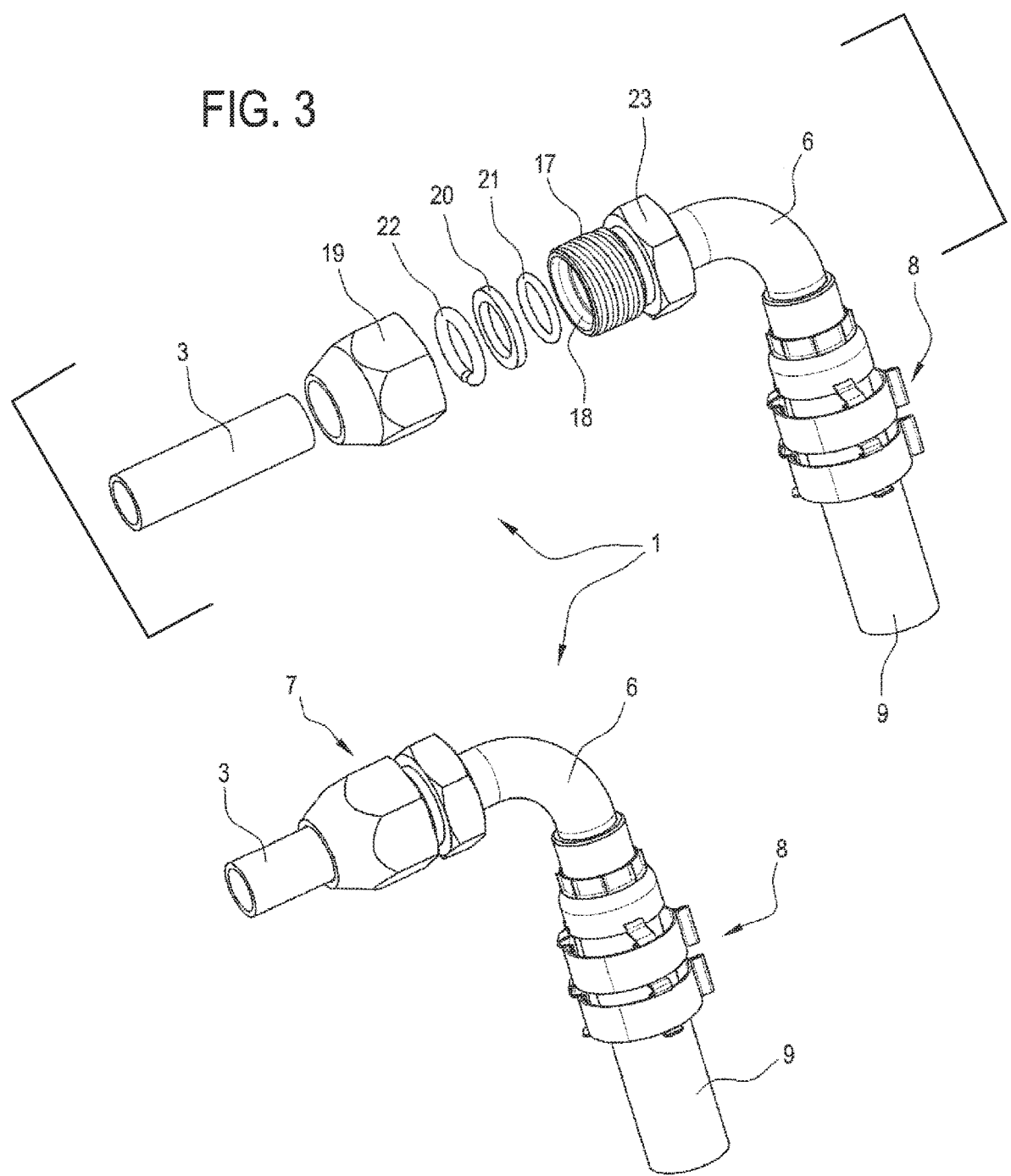
FIG. 3 illustrates the device according to the invention in an exploded and assembled configuration according to a second variant embodiment.

In another case, the sleeve 6 may advantageously be shaped according to a third variant, and have a curved extension with an angle of approximately 90° (FIG. 3).

It should be noted that the curved extension may be, more generally speaking, any angle.

Moreover, the sleeve 4 may have, more generally speaking, any shape (combination of straight and/or curvilinear portions).

The device 1 according to the invention is advantageously prepared in the form of a kit, with different sizes, so it can be easily sold to fitters and repair technicians.

For its use for repair or replacement, once the connecting conduit to be replaced has been identified, it is necessary to firstly cut the stretch of pipe 3 at the two ends of the conduit to be replaced by means, for example, of a pipe cutter.

The stretch of pipe must be cut to a length at least sufficient for applying the coupling 7, preferably immediately downstream of the deformed stretch for fixing the conduit.

Once the two sections of pipe 3 have been cut, the worn or lacerated conduit can be removed. The remaining parts of the sections of pipe 3 which are still joined to the connectors 2 (FIG. 4) must have burrs removed and be cleaned to allow a correct and easy insertion of the coupling 7.

Once the lock nut 19 has been positioned on the section of pipe 3 on one of the components, the clamping ring 22 is fitted on the section of pipe, the washer 20 is fitted, and then the sealing ring 21, for example of the "O-ring" type, is fitted on the section of pipe.

The threaded head 17 joined to the sleeve 4 (or 5 or 6 depending on the most suitable type) is fitted on the section of pipe, and the lock nut 19 is tightened by gripping with a spanner on the joining part with a prismatic cross section 23.

The pressure of the tapered section inside the lock nut 19 presses on the clamping ring 22 in a radial direction, pushing it in the form of a collar around the stretch of pipe 3, and in an axial direction.

The radial pressure causes the fixing by interference of the block consisting of the threaded head 17, the lock nut 19 and the clamping ring 22 with the stretch of the pipe 3 which passes through the ring.

Moreover, the pressure in an axial direction on the clamping ring 22 is transmitted from the latter on the washer 20 and hence on the seal ring 21 which is thus pressed inside the annular seat 18 inside the threaded head, thereby creating the hermetic seal of the connection.

A stretch of flexible hose 9, cut to size according to what is necessary to re-establish the connection between the two components of the climate control system, is joined at the opposite end of the sleeve 4, using the fitting 8.

The flexible hose used is of the type resistant to high pressures, and the fitting 8 must also be sufficiently robust to guarantee the seal of the connection. For example, according to the embodiments illustrated in FIGS. 1 to 4, use may be made of a clip system 24 tightened by means of a suitable gripper (not illustrated), such as the one according to the patent by the same applicant as this invention (EP 2691680), which is incorporated herein by reference.

More specifically, the fitting 8 comprises a plurality of longitudinal tabs 31 and clips 24, the clips 24, in use, being clamped (that is, tightened) to allow the locking of the flexible hose 9.

The clips 24 fasten outside the longitudinal tabs 31.

It should be noted that the clips 24 are tightened around (externally) the longitudinal flaps 31, firmly fixing the flexible hose 9 to the fitting 8.

Alternatively, as illustrated in FIGS. 5-7, the fitting 8 may comprise a bushing 30 (as shown in FIGS. 5, 6 and 7) which is crimped (deformed plastically) on the flexible hose. After completing the connection on one side, on the first component of the system, the connection is made in the same way on the other side, on the second component.

Obviously, a second kit is also necessary for the second component, which is installed in the same way as described above.

The device, or kit, for replacing worn or lacerated parts of connecting conduits between components of climate control or cooling or hydraulic systems or for connecting components of new climate control or cooling or hydraulic systems, as described in this invention, allows the replacement to be carried out in a universal way, that is to say, completely independently of the type connectors used for connection of the connecting conduits, in a fast and easy manner.

With just a few different models of the sleeve (FIGS. 1, 2, 3, 4, 5 and 6), the conduits can be replaced on any model of vehicle very quickly and without the need to prepare large storage areas and engage resources for purchasing a multitude of different sleeve models.

In other words, the device described makes it possible to provide a universal spares kit, which can be advantageously applied on all the types of vehicles.

The internal diameters of the lock nut 19 and of the threaded head 17 may be available, as can be understood, in a set of values so that the device can be used with all the vehicles available.

Advantageously, regardless of the embodiment, it should be noted that the device 1 makes it possible to avoid the use of welding, which is, as is known, a weak point in pressurised systems since it has a high risk of leaks, requires specialised operators, and moreover there are clear difficulties in carrying it out in situ (for example, inside the engine compartment of a motor vehicle).

It should be noted that the device 1 is applicable to any climate control, cooling or hydraulic system, and is particularly advantageous for the automotive sector.

The invention claimed is:

1. A universal device for connection to a rigid pipe of at least one chosen from a climate control system, a cooling system and a hydraulic system, comprising:
   a coupling;
   a sleeve connected at a first end to an end of the coupling in a sealed fashion and having a second end configured for connection to a flexible hose;
   wherein the coupling comprises:
      a threaded head with an inner annular seat;
      a lock nut configured to be threaded onto the threaded head and including internally a cross-section with a tapered extension suitable for fitting over the rigid pipe;
      a clamping ring configured for insertion inside the lock nut and operative engagement with the tapered extension, the clamping ring having an internal passage for receiving the rigid pipe, the clamping ring having an interruption;
      a washer and a seal ring configured to be applied over the rigid pipe, with the seal ring positioned between the washer and the inner annular seat;
   wherein, in a tightened condition of the lock nut onto the threaded head, the clamping ring is pressed onto and locked to the rigid pipe by the tapered extension;
   a fitting for connecting the sleeve to the flexible hose, the fitting comprising a plurality of longitudinal tabs and clips encircling the longitudinal tabs, the clips in use being clamped to allow locking to the flexible hose.

2. The device according to claim 1, wherein the rigid pipe has a rectilinear extension and has a length sufficient to allow application of the coupling.

3. The device according to claim 1, wherein the sleeve has a rectilinear extension.

4. The device according to claim 1, wherein the sleeve has a curved extension with an angle of approximately 45°.

5. The device according to claim 1, wherein the sleeve has a curved extension with an angle of approximately 90°.

\* \* \* \* \*